United States Patent [19]

Hutt et al.

[11] 3,923,748

[45] Dec. 2, 1975

[54] MERCAPTAN TERMINATED POLYMERS AND METHOD THEREFOR

[75] Inventors: Jack W. Hutt, Encino; Hakam Singh, Newhall, both of Calif.

[73] Assignee: Products Research & Chemical Corporation, Burbank, Calif.

[22] Filed: July 22, 1974

[21] Appl. No.: 490,244

Related U.S. Application Data

[63] Continuation-in-part of Ser. No. 414,653, Nov. 12, 1973, abandoned, which is a continuation-in-part of Ser. No. 239,730, March 30, 1972, abandoned.

[52] U.S. Cl. .............. 260/77.5 CR; 260/77.5 AP; 260/77.5 R; 260/79
[51] Int. Cl.² ......................................... C08G 18/04
[58] Field of Search .......... 260/79, 77.5 AP, 77.5 R, 260/77.5 CR

[56] References Cited
UNITED STATES PATENTS

| | | | |
|---|---|---|---|
| 3,625,925 | 12/1971 | Oswald | 260/79 |
| 3,662,023 | 5/1972 | Keho et al. | 260/79 |

*Primary Examiner*—M. J. Welsh
*Attorney, Agent, or Firm*—Poms, Smith, Lande & Glenny

[57] ABSTRACT

A method for producing mercaptan terminated liquid polymers which are curable to solid polysulfides wherein a liquid polymer having from two to four functional olefinic double bonds is reacted, in the presence of an alkaline initiator but substantially in the absence of molecular nitrogen, with an organic compound containing at least two mercaptan groups, or a liquid polymer having at least two terminal mercaptan groups, or hydrogen sulfide. There is also disclosed mercaptan terminated polymers having the following formula:

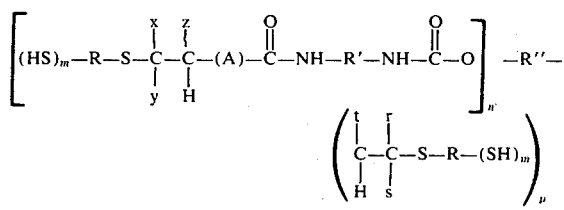

in which each of $x$, $y$ and $z$ is hydrogen, hydrocarbon, alkoxy, phenoxy, or halogenated derivatives thereof; each of $r$, $s$ and $t$ is hydrogen or lower alkyl; $m$ is an integer between 1 and 2; $n$ is an integer between 1 and 4; $p$ is an integer from 0 to 3; the sum of $n$ and $p$ is between 2 and 4; $R'$ is a divalent organic radical; $R''$ is the backbone of a liquid polymer precursor; $R$ is the grouping of the polymercapto organic compound $R-(SH)_{m+1}$; and $A$ is the fragment or grouping of an organic olefinic precursor compound having an active hydrogen:

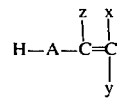

The cured polysulfides made from the mercaptan terminated liquid polymers, said cured polysulfides having the following structure:

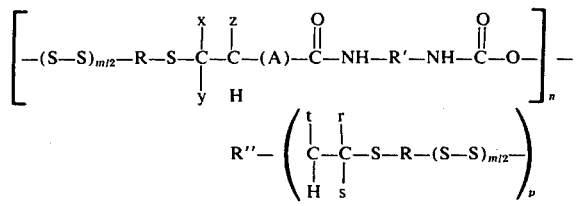

wherein $m$, $n$, $p$, $x$, $y$, $z$, $r$, $s$, $t$, A, R, R' and R'' have the same significances as set forth above.

12 Claims, No Drawings

MERCAPTAN TERMINATED POLYMERS AND METHOD THEREFOR

CROSS-REFERENCE TO RELATED APPLICATIONS

This application is a continuation-in-part of our copending application Ser. No. 414,653, filed Nov. 12, 1973 (now abandoned) which in turn is a continuation-in-part application of Ser. No. 239,730, filed Mar. 30, 1972 (now abandoned).

BACKGROUND OF THE INVENTION

There are a great number of terminally reactive liquid polymers available today in which the liquid polymer can be cured to a solid elastomer.

The mercaptan terminal, because of its rapid reactions at room temperature, and the fact that sulfur imparts resistance to ozone attack, is a useful group.

Exemplary of mercaptan terminated liquid polymers are those found in U.S. Pat. Nos. 2,466,963 and 2,474,859. The cured materials, however, suffer from being weak and have a tendency to cold flow and fragment. Furthermore, their manufacture by a condensation process requires expensive removal of byproducts.

Another addition process is illustrated by U.S. Pat. No. 3,625,925 wherein polythiols are reacted with polyolefins to form mercaptan terminated polyethers. These products are also weak and the process for their preparation involves use of large excesses of thiols which must later be removed.

Approaches which attempt to combine the known high strength of the polyurethanes with the advantages of the mercaptan terminal are found and described in U.S. Pat. Nos. 3,446,780 and 3,547,986. Products of these reactions however have not had commercial acceptance because of their instability and nonreproducibility. They exhibit surface tack and contain residual olefinic and hydroxyl groups, which are both harmful to physical properties and weather resistance.

Still another approach is illustrated by U.S. Pat. No. 3,662,023 where a polyene-thiol coreaction product is formed in situ, i.e., a urethane containing olefin is mixed with a polythiol ester and the final product is a solid elastomer.

Such materials are also irreproducible and large arbitrary excesses of cross-linkages are built into the molecule to assure adequate hardening under field conditions. Also the toxicity and noxious odor of these mercaptans prevent their utilization.

Further, the ester linkages present in the mercapto esters used in the cited patent are unstable in the weather. Additionally the tin catalysts used for formation of the urethane precursor promotes their hydrolytic decomposition on weather exposure. Generally, all known mercaptan containing polyurethanes have been found unstable on storage, changing in viscosity and losing their ability to cure.

We have found, unexpectedly, that by careful selection of catalysts, exclusion of molecular nitrogen, and by utilizing a process which completely converts all terminals to mercaptan groups only—with no other reactive sites—we obtain polymers which at cross link densities approaching zero give stable, dry, tough, elastomeric solids.

For example, a polyoxypropylene diol of 4,000 molecular weight was reacted with one mole of 2,4 tolylene diisocyanate for every equivalent of hydroxyl. An equivalent amount of allyl alcohol was then added and the mixture heated until reaction was essentially complete. One mole of 1,2 ethane dithiol was added along with 0.5% peroxide catalyst and 0.5% tetramethyl guanidine. After 72 hours heating at 140°F, the mixture was cooled and mixed with a lead peroxide paste. The product set to a tack free rubbery solid with an instantaneous Shore A hardness of 10. The product had high elongation without substantial recovery indicating little or no cross-linking.

Under the conditions cited herein, the conversion of materials to mercaptan functionality is so effective that very low cross-link densities yield uniformly cured products of high hardness and toughness.

In contrast to the uniform cures obtained by the present invention, the prior art when using the same precursor polymeric glycols obtains cured products which may vary widely in cure rate, hardness, surface tack, strength, elongation, etc. depending upon the relative amounts of olefinic terminals.

The reason the prior art obtains such divergent cured products is because these precursor polymeric glycols are chain stopped with varying quantities of olefinic terminals. Such glycols when reacted with, for example, tolylene diisocyanate to cross link them, yield products which have widely dissimilar physical properties in spite of the fact that polyether glycols of apparently identical functionality and identical hydroxyl numbers are utilized as starting materials. Literature statements of equivalent functionality and hydroxyl number of high molecular weight polyols do not completely characterize them. A typical polyol will have a certain number of hydroxyl groups and varying olefin terminations such as vinyl and allyl. The amount of olefin termination can be as high as 75% but normally is 25% or less.

Reacting such polyglycols with excess diisocyanate followed by an unsaturated alcohol, as is done in the instant process, will give polymers in which all of the terminals are unsaturated. However, because some of the unsaturation is vinyl and some is allyl, their activities would be expected to vary. If polymers having this type of olefinic double bond are cured by the methods utilized in the prior art such as U.S. Pat. No. 3,662,023 the divergent groups (e.g. vinyl and allyl) would respond at widely different rates requiring long periods of time for complete cure. It is apparent from patent 3,662,023 that such is indeed the case.

SUMMARY OF THE INVENTION

From the foregoing, it is a desideratum in the art to produce liquid mercaptan-terminated polymers which give uniform results on cure and have high chemical, heat and light resistance, high tear strength, adhesive ability, and low toxicity.

The present invention provides such novel liquid mercaptan terminated polymers at a relatively low cost; such polymers being easily cured to solid elastomers. Such cured products are tough and elastic and show excellent ultraviolet light stability and, just as importantly, have improved water and electrical resistance since no salts contaminate the polymer.

DESCRIPTION OF THE PREFERRED EMBODIMENTS

The present invention is based, in part, upon the surprising discovery that excellent mercaptan terminated polymers can be produced by the simple expedient of taking well known and relatively inexpensive liquid polymers having from two to four reactive (terminal) olefinic double bonds and reacting these polymers with hydrogen sulfide or organic compounds having two to three reactive SH groups (mercaptan groups). Thus hydrogen sulfide can react with such liquid polymers having two to four olefinic double bonds to form the corresponding liquid mercaptan terminated polymer, having two to four terminal mercaptan groups. The amount of hydrogen sulfide utilized is at least 1 mole for each equivalent of liquid olefinic polymer i.e., all of the olefinic double bonds are reacted with the hydrogen sulfide to form a polymer having only terminal or reactive mercaptan groups.

This reaction can be exemplified by the following equation:

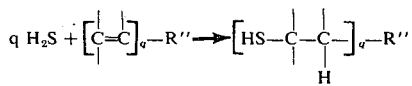

wherein $q$ is a positive integer of from 2 to 4, and $R''$ is the backbone of a liquid polymer precursor.

The present invention is also based on the discovery that a liquid polymer having two to four terminal (i.e. reactive) olefinic double bonds may be reacted with an organic compound containing two to three mercaptan groups and preferably two mercaptan groups. Because of economic considerations generally the organic compound will be a dimercaptan since this type of compound is more readily available than trimercaptan. Alternatively, the liquid polymer having two to four terminal olefinic double bonds may be reacted with a polymercaptan liquid polymer. The general reaction may be exemplified as follows:

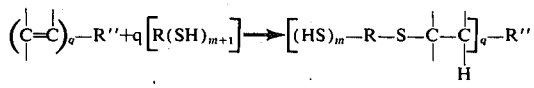

wherein R is the grouping of the mercapto compound $R-(SH)_{m+1}$, $R''$ is the backbone of a liquid polymer, $m$ is an integer between 1 and 2 and $q$ has the same significances as set forth above.

The starting liquid polymer having two to four terminal (reactive or functional) olefinic double bonds can be any liquid polymer. The only criticality in such a polymer is that it contains from two to four terminal olefinic double bonds but it is preferred if the polymer has two to three double bonds. Such polymers may include polyethers, polyesters, polyacrylates, and polyurethanes.

As noted above, if the particular starting polymer does not contain the requisite number of terminal olefinic double bonds, such olefinic double bonds can be added to the polymer by the method of the present invention. For example, there are numerous hydroxyl containing polymers (which may also contain olefinic terminations) that can be utilized to form liquid polymers having two to four terminal olefinic double bonds. For example, the starting liquid polymer may be a polyester glycol which is then reacted with an organic compound having at least two isocyanate radicals (preferably two) followed by the addition of an organic olefinic compound having an active hydrogen such as an organic alcohol or an organic secondary amine containing one or more olefinic double bonds. As an example, the product of the first step of reaction between the isocyanate groups and the hydroxyl groups of the polymer (which may also contain terminal olefinic groups) would have the following formula:

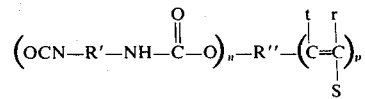

wherein each of $r$, $s$ and $t$ is hydrogen or lower alkyl; $n$ is an integer between 1 and 4; $p$ is an integer from 0 to 3; $R'$ and $R''$ have the same significances as set forth above.

Because the liquid polymer containing terminal hydroxyl groups may also contain terminal olefinic double bonds the resulting compound may also contain terminal olefinic double bonds. These double bonds are available for reaction with the mercaptan containing compound and because, additionally, an organic compound having at least two isocyanate groups was utilized as one of the starting materials there also remains at least one isocyanate group which is capable of reacting with an organic olefinic compound having an active hydrogen (e.g. allyl alcohol, methyl allyl amine, methyl allyl alcohol, diallyl amine, hydroxy ethyl acrylate, etc.), said organic olefinic compound having the following formula:

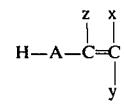

wherein each of $x$, $y$ and $z$ is hydrogen, hydrocarbon, alkoxy, phenoxy or halogenated derivatives thereof and A is the fragment or grouping of an olefinic precursor compound having an active hydrogen:

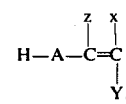

This reaction will form the following compound:

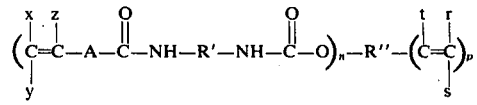

wherein A, $R'$, $R''$, $x$, $y$, $z$, $r$, $s$, $t$, $n$ and $p$ all have the same significances as set forth above.

It should be noted that the preferred compounds of the foregoing reaction are those in which A can be represented as D-B wherein B is O or N-(lower) aliphatic and D is lower alkylene ester, lower alkylene ether, lower alkylene, and lower halogenated alkylene.

From the foregoing it is readily apparent that a variety of liquid polymers containing two to four double bonds can be used in the present invention and, most importantly, such polymers can be made by the procedure outlined above by reacting polymers containing terminal hydroxyl groups with a diisocyanate compound and reacting the resulting polymer with an organic olefinic compound having an active hydrogen atom. Most isocyanate compounds have been successfully employed and include all of the difunctional products such as tolylene diisocyanate, diphenylmethane-4,4'-diisocyanate, 1,6 hexamethylene diisocyanate, and dicyclohexylmethane-4,4'-diisocyanate.

The specific liquid polymers which have been utilized successfully are polyoxypropylene polyols, polyoxypropylene-polyoxyethylene copolymer polyols, polyoxypropylene polymers having up to 75% (e.g. 50%) olefin termination, polycaprolactone polyols, polyoxytetramethylene polyols and polyester polyols.

When the olefin terminated polymers are reacted with a polymercaptan organic compound, mercaptan terminated polymers having the following formula are formed:

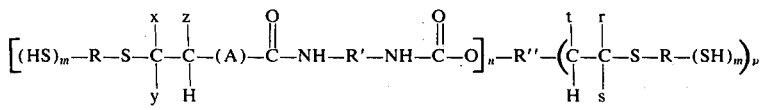

wherein $x$, $y$, $z$, $r$, $s$, $t$, $m$, $n$, $p$, R, R', R'' and A each have the same significances as set out above.

Compounds which have been found useful as sources of the polymercaptan organic compounds (i.e. organic compounds having from two to three mercaptan groups) include, but are not limited to, dimercapto alkanes having from 2 to 12 carbon atoms, dimercapto aryl ethers, and dimercapto alkyl ethers having from 2 to 12 carbon atoms. Specific compounds found useful include 1,6-dimercapto hexane; 1,2-dimercapto ethane; beta, beta'-dimercapto diethyl ether; and p,p'-mercaptomethyl diphenyl oxide.

In addition to utilizing polymercaptan organic compounds, as exemplified above, the invention also contemplates using a liquid polymer as the source of mercaptan groups. For example, mercaptan terminated polyethers such as those exemplified in U.S. Pat. No. 3,431,239 have been utilized to good effect as well as mercaptan terminated polysulfides such as those set forth in column 1 of U.S. Pat. No. 3,138,573.

A critical reaction condition is the unexpected discovery that it is vital to prevent molecular nitrogen from contacting the reactants during the reaction. This can be accomplished by slowly stirring the reactants to prevent any vortex formation in the liquid reactants. Thereafter, the temperature is preferably raised and stirring is discontinued. This procedure eliminates substantially all of the nitrogen from contacting any of the reactants except on the surface which, we have found, does not interfere with the reaction.

It is also important in the present invention to provide a correct ratio of olefin to mercaptan. In our invention it is necessary that at least about 1 mole of di-, or trimercaptan compound be utilized for each olefin equivalent. This ratio is necessary to insure that each olefinic double bond is terminated with the particular mercaptan. If, for example, less than 1 mole of mercaptan compound is utilized for each equivalent of olefinic compound the resulting polymer is not a mercaptan terminated liquid polymer but rather a partially cured thioether. One of the reasons for the result is because one of the mercaptan groups reacts with the olefinic double bond while the other mercaptan group or groups react with other olefinic double bonds.

As has been noted above, the reaction herein must take place at certain specific ratios and substantially in the absence of molecular nitrogen. In addition, certain compounds are necessary to initiate and catalyze the reaction.

One of the most critical areas of the present invention is the necessity for the use of a strongly alkaline initiator. Exemplary of such strongly alkaline initiators are organic amines such as heterocyclic tertiary amines (e.g. diazabicyclo (2,2,2) octane) and substituted guanidines having at least one tertiary nitrogen atom such as lower alkyl substituted guanidines. It is vitally important that the alkaline initiator be a base having a $pK_b$ of 6.0 or less and having no aryl groups; inasmuch as weak initiators such as weak amines (e.g. aniline and dimethyl aniline) are inoperative. The particular amount of alkaline initiator is critical and it is generally desirable to utilize at least about 0.01% by weight and preferably about 0.05% by weight, the limitation on the maximum amount being the influence on the stability of the resulting mercaptan polymer during storage and use.

It is usually desirable to utilize a free radical initiating catalyst such as a peroxide catalyst (e.g. tertiary butyl perbenzoate) in conjunction with the alkaline initiator. The amount of free radical initiating catalyst can vary but it is preferred that from 0.1% to 1.0% by weight, based on the reactants is utilized. Amounts exceeding 1% in conjunction with the alkaline initiator in the reaction excessively oxidize the mercaptan groups to disulfides resulting in the loss of the initial mercaptan and premature oxidation of the final polymer to disulfide causing gelation of the material.

The mercaptan terminated polymers produced by the above method are easily cured to solid, elastomeric polymers with oxidizing agents, epoxides or rubber vulcanizing agents. Oxidation cures of between 5 minutes and 8 hours at room temperature are readily obtainable to give high strength, resilient elastomers of the following general composition:

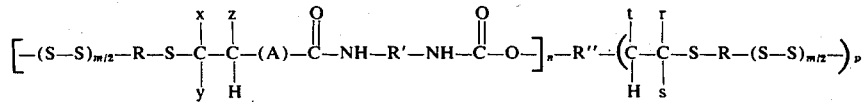

wherein $m$, $n$, $p$, $x$, $y$, $z$, $r$, $s$, $t$, A, R, R' and R'' have the same significances as set forth above.

The cured product of the present invention must have a Rex hardness of at least 10 (at 75°F.) and preferably higher. It is by determining the Rex hardness of the final cured product that one can determine whether or not the intermediate product (i.e. the uncured mercaptan) is satisfactory.

The criticality of utilizing the correct alkaline initiator is shown in the following Table I wherein the mercaptan terminated polymers obtained by reacting 100 grams of olefin terminated polymer (Example III) with 7.2 grams of beta, beta' dimercapto diethyl ether were cured with a lead peroxide paste. The reactions for experiments 1–5 were allowed to continue for 5 days whereas the reactions of 6–8 were allowed to continue for only 1 day. The amount of amine utilized was 0.1 gram for experiments 2–5 and 0.05 grams for experiments 6–8 and was used in conjunction with t-butyl perbenzoate at 0.05% concentration.

TABLE I

|  | 1 | 2 | 3 | 4 | 5 | 6 | 7 | 8 |
|---|---|---|---|---|---|---|---|---|
| Amine used | None | Dimethyl Aniline | DABCO* | Dimethyl Dodecyl Amine | Dimethyl Benzyl Amine | TMG** | TMG | TMG |
| Reaction Temperature | 140°F | 140°F | 140°F | 140°F | 140°F | 70°F | 100°F | 140°F |
| Reaction Time (days) | 5 | 5 | 5 | 5 | 5 | 1 | 1 | 1 |
| Hardness*** | −6 | 0 | 10 | 4 | −3 | 18 | 24 | 28 |

*DABCO = Diazabicyclo (2,2,2) octane
**TMG = Tetramethyl guanidine
***Hardness = Hardness, in Rex, of cured product As is apparent from the foregoing table, the alkaline initiator must be chosen correctly or otherwise the reaction fails as indicated by the Rex hardness of the final cured product.

The same is true when nitrogen is added to the reaction. For example, when a reaction is conducted substantially in the absence of nitrogen the final cured product has a Rex hardness of 34. In contrast thereto, when nitrogen is added, although identical conditions and reactants are used, the final cured product reamins a liquid having a viscosity of from 2,000 to 3,000 poises. Thus, it can be seen that both the alkaline initiator and the absence of molecular nitrogen are critical in the present invention.

In order to fully illustrate the invention there is given below presently preferred embodiments. In these embodiments, parts are by weight unless otherwise specifically stated, temperature is in Fahrenheit and M.W. stands for molecular weight.

EXAMPLE I

Preparation of an olefin terminated product was carried out as follows: to 1500 grams of polyoxypropylene triol having a M.W. of 4500, and little or no unsaturated ends, and a hydroxyl number of 33.3 was added 174 grams of 2,4 tolylene diisocyanate. The mixture was kept at 120°F for 24 hours. To the above obtained prepolymer was mixed 58 grams of allyl alcohol, and the mixture allowed to stand at 158°F for an additional 72 hours. There was obtained a tri-olefin terminated polymer.

EXAMPLE II

| Olefin-terminated polyether from Example I | 100 | gms |
| beta, beta' dimercapto diethyl ether | 8.0 | gms |
| t-butyl perbenzoate | 0.5 | gms |
| tetramethyl guanidine | .05 | gms |

Procedure:

The materials were slowly stirred together (no vortex formed) initially in a polyethylene container. The batch was covered and placed in a 140°F oven for 16 hours without stirring. Analysis by infrared showed conversion of all olefin groups. The final product had a viscosity of 1560 poise and a hardness of 30 Rex when cured with lead peroxide paste.

EXAMPLE III 2,000 grams of an equimolar mixture of a polyoxypropylene triol (6,000 M.W.) and polyoxypropylene diol (4,000 M.W.) having 5% terminal olefinic double bonds was used in this example. To this mixture was added 166 grams of 2,4 tolylene diisocyanate. The resulting mixture was allowed to stand for 24 hours at 120°F. To the resulting prepolymer was mixed 55.5 grams of allyl alcohol and the mixture allowed to stand at 160°F for 72 hours. There was obtained an olefin terminated polymer.

EXAMPLE IV

| Olefin terminated polymer from Example III | 100 | gms |
| beta, beta'-dimercapto diethyl ether | 7.2 | gms |
| t-butyl perbenzoate | 0.5 | gms |
| tetramethyl guanidine | .05 | gms |

After heating identically as in Example III, the infrared analysis showed a 100% conversion of olefin groups. The product had a viscosity of 2500 poise and when cured with lead peroxide paste had a final Rex hardness of 35.

EXAMPLE V

To 1500 grams of the trifunctional polyoxypropylene triol used in Example I was added 174 grams of 2,4 tolylene diisocyanate. After 24 hours at 120°F, the mixture was blended with 116 grams of hydroxy ethyl acrylate to give an acrylic termination. 145 grams of beta, beta'-dimercapto diethyl ether along with 0.75 grams of tetramethyl guanidine were mixed with the polymer and kept at 120°F overnight with no stirring. The resulting polymer was rapidly cured with lead peroxide paste and barium oxide catalyst paste to give a tough polysulfide rubber with a Rex hardness of 40.

EXAMPLE VI 1000 grams of polyoxytetramethylene diol (M.W. = 2,000) was mixed with 174 grams of 2,4 tolylene diisocyanate at a temperature of 120°F. After 24 hours, 58 grams of allyl alcohol was added and the mixture heated for 72 hours at 158°F. The resultant product was slowly mixed (no vortex formed) with 145 grams of beta, beta'-dimercaptodiethyl ether, 9.0 grams of t-butyl perbenzoate, and 0.6 grams of tetramethyl guanidine. The product was held for 48 hours at 158°F with no stirring. The resultant polymer cured to a tack free rubbery solid with the lead dioxide paste accelerator of Example II.

EXAMPLE VII

To 1500 grams of the olefin terminated polymer described in Example III was added 700 grams of a Thiokol polysulfide, LP-8. The incompatible mixture was slowly blended with 100 grams of toluene, 9 grams of t-butyl perbenzoate and 0.8 grams of tetramethyl guanidine. The mixture was heated at 140°F for 72 hours with no stirring. At the end of this period, the solvent was removed in a wiped film evaporator at 300°F. The resultant product was now a very viscous homogeneous liquid. No olefin was found by IR analysis. When cured with lead dioxide dispersed in hydrogenated biphenyl and barium oxide, it cured to a soft polysulfide rubber.

EXAMPLE VIII

To 1732 grams of the olefin-terminated product prepared in Example I was added 94 grams of 1,2 dimercapto ethane, 9 grams of t-butyl perbenzoate, and 0.9 grams of tetramethyl guanidine. The mixture was heated for 48 hours at 140°F with no stirring. The resultant liquid cured to a polysulfide with lead dioxide paste and barium oxide catalyst to a Rex hardness of 40.

In the preferred exemplary embodiments given above, the specific diisocyanate compound utilized was tolylene diisocyanate. However, other diisocyanate compounds have been utilized to react with the starting liquid polymer having terminal hydroxyl groups in order to form the corresponding isocyanate terminated polymer which, in turn can be reacted with an alcohol or amine having an active hydrogen and olefinic double bonds. Examples of such organic polyisocyanate compounds are 1,6 hexamethylene diisocyanate, diphenylmethane-4,4'-diisocyanate, 4,4'-biphenylene diisocyanate, dicyclohexylmethane-4,4'-diisocyanate, isophorone diisocyanate and diphenyl 3,3'-dimethoxy-4,4' diisocyanate. From the foregoing it is apparent that R'' in the preceding formulas can be a variety of substituents, among which are included aliphatic of from 2 to 12 carbon atoms, cycloaliphatic, and aryl.

The mercaptan terminated liquid polymers of the present invention vary in molecular weight from about 1000 to 15,000 and have a viscosity, at 25°C, of less than 10,000 poise and preferably less than 5000 poise.

The mercaptan terminated liquid polymers of the present invention may easily be cured, at room temperature, to solid rubbery polysulfide elastomers having a Rex hardness of at least 10. The cure may be affected by utilizing an oxidizing agent such as lead dioxide, zinc peroxide, barium peroxide, manganese dioxide, and alkali or alkaline earth metal dichromates. These oxidizing agents may be utilized in amounts of 3 to 20 parts by weight per 100 parts by weight of liquid mercaptan polymer and, preferably, from about 3 to 10 parts by weight per 100 parts by weight of the liquid mercaptan polymer.

Another class of curing agents useful in the present invention are the epoxides such as epoxy resins formed by the condensation of epichlorohydrin and bisphenol A. The amount of epoxide to effect room temperature cure is approximately stoichiometric.

A further class of curing agents useful in curing the novel liquid mercaptan terminated polymers of the present invention to solid, tack free, rubbery elastomeric polymers are rubber vulcanizing compounds such as sulfur and zinc oxide. These vulcanizing agents may be merely mixed with the liquid mercaptan terminated polymers to give rapid cures. The amount of such vulcanizing agents necessary to give good cures is not critical.

The above curing agents can be utilized to cure the liquid polymers of the present invention either as 2 part systems or 1 part systems. In the one part system, the polymers of the present invention may be used as a one part stable liquid composition which can be completely cured without agitation, in accordance with U.S. Pat. No. 3,255,017. Below is given exemplary of one part systems.

EXAMPLE IX

The mercaptan terminated polymer prepared in Example IV was formulated as follows:

|  | Parts by Weight |
| --- | --- |
| Mercaptan polymer, Ex. IV | 100 |
| Calcium carbonate precipitated | 10 |
| Titanium dioxide | 10 |
| Mercaptosilane, A-189 | 1 |
| Calcium peroxide paste, 50% in aroclor | 20 |
| Barium oxide paste, 50% in HB-40 | 5 |

The above formula is a stable single-package material which cures, on exposure to moisture in the air, to a good rubber with the following properties:

| | |
| --- | --- |
| Cure through, 1/8", RT, 50% RH | 72 hours |
| Hardness, Rex | 40 |
| Weather resistance | Excellent, no checking or discoloration (six weeks weatherometer) |
| Adhesion | Good on glass, aluminum |

EXAMPLE X

The following formula does not need water removal for stability, but depends upon atmospheric oxygen for cure:

|  | Parts by Weight |
| --- | --- |
| Mercaptan polymer, Ex. IV | 100 |
| Calcium carbonate, pptd. | 100 |
| Titanium dioxide | 10 |
| Tetramethyl guanidine | .5 |
| Oxidation catalyst | .5 |

The above product, which is also a stable single-package material, when exposed to the atmosphere cured even more rapidly than Example IX to give a tough and elastic rubber showing excellent UV stability.

EXAMPLE XI

Exemplary of a two-part system is given below:

|  |  | Parts by Weight |
| --- | --- | --- |
| Part A: | Mercaptan Polymer, Ex. VII | 100 |
|  | Calcium carbonate, pptd. | 200 |
|  | Plasticizer | 100 |
|  | Titanium dioxide | 10 |
|  | Water | 2 |
| Part B: | Calcium peroxide | 10 |
|  | Hydrogenated biphenyl | 10 |
|  | Calcium hydroxide | 2 |

The mixture of Part A and Part B gave a cure overnight to a product of good elastic qualities and outstanding weather-ability.

EXAMPLE XII

| | | Parts by Weight |
|---|---|---|
| Part A: | Mercaptan Polymer, Ex. VIII | 100 |
| | Calcium carbonate | 200 |
| | Plasticizer | 100 |
| | Titanium dioxide | 10 |
| | DABCO | 1 |
| | Water | 10 |
| Part B: | Epoxy resin (Epon 828) | 10 |

The above 2 parts when mixed together gave a good cure overnight at room temperature to a solid product of good elastic and adhesive qualities.

EXAMPLE XIII

| | Parts by Weight |
|---|---|
| Mercaptan Polymer, Ex. VIII | 100 |
| Zinc Oxide | 40 |
| Sulfur | 4 |
| *Tetrone A (accelerator) | 1 |

*Tetrone A is dipentamethylene - thiuram - tetrasulfone.

The above mixture gave a good cure in 16 hours at room temperature to a product having a hardness of 10-15 Rex and 200% elongation.

In the one part system, exemplified in Example IX, there is thoroughly dispersed within the polymer a dormant curing agent for the polymer which is activated by the presence of moisture. Similarly, there is thoroughly dispersed within the polymer a water-soluble deliquescent accelerating agent selected to attract and absorb moisture from the surroundings and to hasten the curing of the polymer by the curing agent. The polymer may be initially dried to remove any moisture or, preferably, the deliquescent accelerating agent may also be a desiccating agent to dry the polymer. Alternatively, the polymer may have thoroughly dispersed therein a single desiccating deliquescent, dormant curing and accelerating agent which is adapted to dry the polymer, to attract and absorb moisture from the surroundings, to cure the polymer when activated by the presence of moisture and to hasten the curing of the polymer. Such surroundings may include a body of water or a body of gas containing essentially only moisture such as atmospheric air of normal humidity.

We claim:
1. A method of producing mercaptan terminated liquid polymers curable to solid polysulfides, said liquid polymers having from two to four terminal mercaptan groups which comprises:
   forming a reaction admixture consisting essentially of
   (1) a liquid polymer reactant having two to four terminal reactive olefinic double bonds, (2) an initiating effective amount of alkaline initiator having a pK$_b$ value of 6.0 or less and no aryl groups, and (3) a sulfur containing reactant selected from the group consisting of an organic compound having from two to three terminal mercaptan groups, a liquid polymer having from two to three terminal mercaptan groups, and hydrogen sulfide, the ratio of sulfur containing reactant to liquid polymer reactant being about 1 mole of sulfur containing compound for each olefin equivalent of liquid polymer; heating at a temperature between room temperature and the boiling point of the reactants substantially in the absence of nitrogen until reaction is complete as indicated by the disappearance of the olefinic double bonds.

2. A method according to claim 1 wherein the reactive admixture contains a catalytic effective amount of a free radical initiating catalyst in an amount of from 0.1 to 1.0 % by weight.

3. A method according to claim 2 wherein the free radical initiating catalyst is a peroxide.

4. A method according to claim 3 wherein the peroxide is tertiary butyl perbenzoate.

5. A method according to claim 1 wherein the alkaline initiator is an organic amine in an amount of from 0.01 to 0.1% by weight.

6. A method according to claim 5 wherein the organic amine is selected from the group consisting of heterocyclic tertiary amine and lower alkyl substituted guanidine having at least one tertiary nitrogen atom.

7. A liquid polymer curable to a solid polysulfide and containing no reactive olefinic double bonds and having the formula:

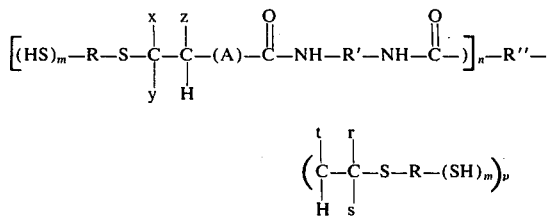

in which each of x, y and z is hydrogen, hydrocarbon, alkoxy, phenoxy, or halogenated derivatives thereof; each of r, s and t is hydrogen or lower alkyl; m is an integer between 1 and 2; n is an integer between 1 and 4; p is an integer from 0 to 3; the sum of n and p is between 2 and 4; R' is a divalent organic radical; R'' is the backbone of a liquid polymer precursor; R is the grouping of the polymercapto organic compound R—(SH)$_{m+1}$; and A is the fragment of an organic olefinic precursor compound having an active hydrogen:

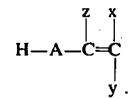

8. A liquid polymer according to claim 7 wherein R is selected from the group consisting of alkylene having from two to twelve carbon atoms, aryl ether, alkylene ether having from 2 to 12 carbon atoms, alkylene ester having from 2 to 12 carbon atoms and aryl.

9. A liquid polymer according to claim 7 wherein A has the formula D-B wherein B is O, or N-(lower) aliphatic and D is lower alkylene ester, lower alkylene ether, lower alkylene and halogenated lower alkylene.

10. A method of producing solid, tack free, rubbery, elastomeric polymers which comprises:
   curing the liquid polymer of claim 7 by admixing therewith a member selected from the group consisting of an oxidizing agent in an amount of 3 to 20 parts by weight per 100 parts by weight of liquid polymer, a stoichiometric amount of epoxide, and a rubber vulcanizing agent; and allowing the mixture to stand until a solid cured polymer is formed having a Rex hardness of at least 10.

11. A solid, tack free, elastomeric polysulfide polymer having the formula:

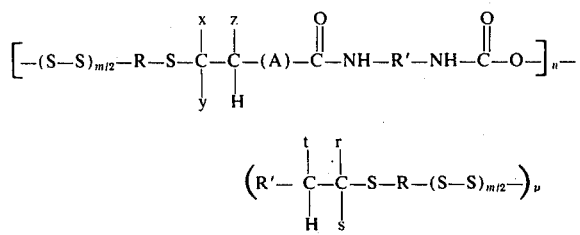

in which each of x, y and z is hydrogen, hydrocarbon, alkoxy, phenoxy, or halogenated derivatives thereof; each of r, s and t is hydrogen or lower alkyl; m is an integer between 1 and 2; n is an integer between 1 and 4; p is an integer from 0 to 3; the sum of n and p is between 2 and 4; R' is a divalent organic radical; R'' is the backbone of a liquid polymer precursor; R is the grouping of the polymercapto organic compound $R-(SH)_{m+1}$; and A is the fragment or grouping of an organic olefinic precursor compound having an active hydrogen:

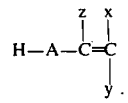

12. A solid polymer according to claim 11 wherein R is selected from the group consisting of alkylene having from 2 to 12 carbon atoms, aryl ether, alkylene ether having from 2 to 12 carbon atoms, alkylene ester having from 2 to 12 carbon atoms and aryl.

* * * * *